United States Patent [19]
Randles

[11] Patent Number: 5,789,049
[45] Date of Patent: Aug. 4, 1998

[54] PREFORMED, FOLDABLE DEVICE FOR REINFORCING OR REPAIRING CARTON CORNERS

[76] Inventor: Kimberly W. Randles, 5310 SW. Santa Monica Ct., Portland, Oreg. 97221

[21] Appl. No.: 835,869

[22] Filed: Apr. 8, 1997

Related U.S. Application Data

[63] Continuation of Ser. No. 541,679, Oct. 10, 1995, abandoned.

[51] Int. Cl.[6] ............................................. B32B 7/06
[52] U.S. Cl. .................... 428/40.1; 428/43; 428/80; 229/199
[58] Field of Search ................... 428/40.1, 42.2, 428/43, 80, 542.8; 229/198.1, 189, 198.3, 199; 206/453, 586

[56] References Cited

U.S. PATENT DOCUMENTS

| | | | |
|---|---|---|---|
| 96,108 | 10/1869 | Hendrickson | 229/198.1 |
| 1,102,750 | 7/1914 | Hawkins | 229/198.1 |
| 1,667,279 | 4/1928 | Allen | 206/453 |
| 2,311,857 | 2/1943 | Noah et al. | 229/199 |
| 2,805,810 | 9/1957 | Butz | 229/14 |
| 3,137,087 | 6/1964 | Stroyer | 45/683 |
| 3,200,547 | 8/1965 | Johnson | 52/288 |
| 3,368,736 | 2/1968 | McKellick | 229/49 |
| 3,511,464 | 5/1970 | Doll | 248/345.1 |
| 3,717,968 | 2/1973 | Olsen et al. | 52/288 |
| 3,762,626 | 10/1973 | Dorsey | 229/14 |
| 3,922,408 | 11/1975 | Smith | 428/40 |
| 3,975,564 | 8/1976 | Jones | 428/174 |
| 4,915,247 | 4/1990 | Odenthal | 220/4 |
| 5,181,611 | 1/1993 | Liebel | 206/453 |
| 5,217,774 | 6/1993 | Finrow | 229/199 |

*Primary Examiner*—Alexander Thomas
*Attorney, Agent, or Firm*—Stoel Rives, LLP

[57] ABSTRACT

The present invention comprises a flat plastic piece shaped such that, on being folded, it forms a right-angled corner piece, with one end of the corner piece having a triangular-shaped lid formed from two overlapping triangular subsections or flaps. An adhesive strip having a removable backing is provided on one side of the plastic piece, whereby, on removal of the backing, the assembled right-angled corner piece can be permanently adhered to a corner of a box or carton.

11 Claims, 1 Drawing Sheet

U.S. Patent     Aug. 4, 1998     5,789,049
FIG. 1
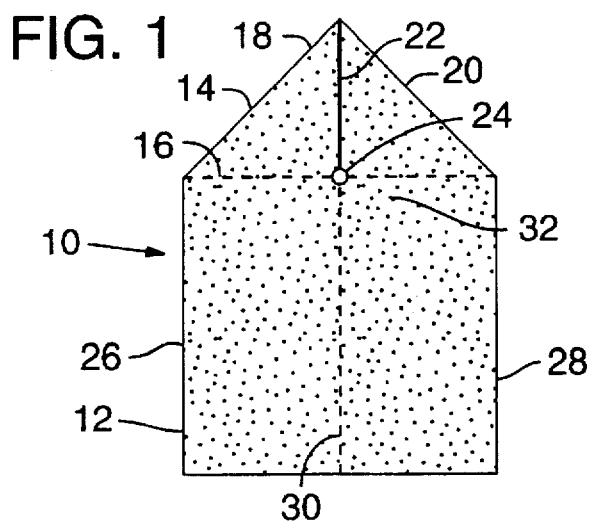
FIG. 2
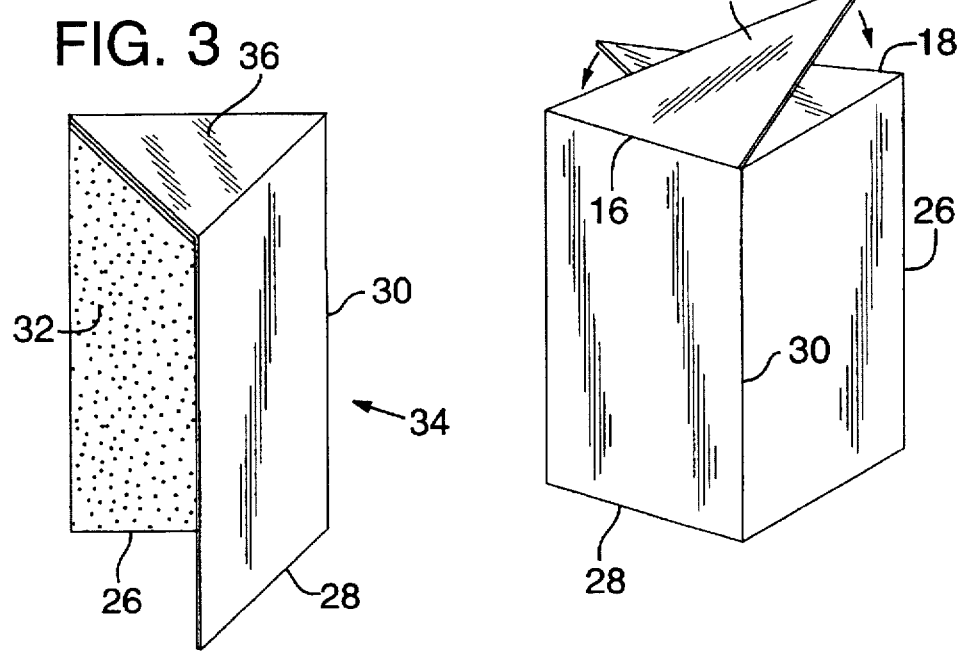
FIG. 3
FIG. 4
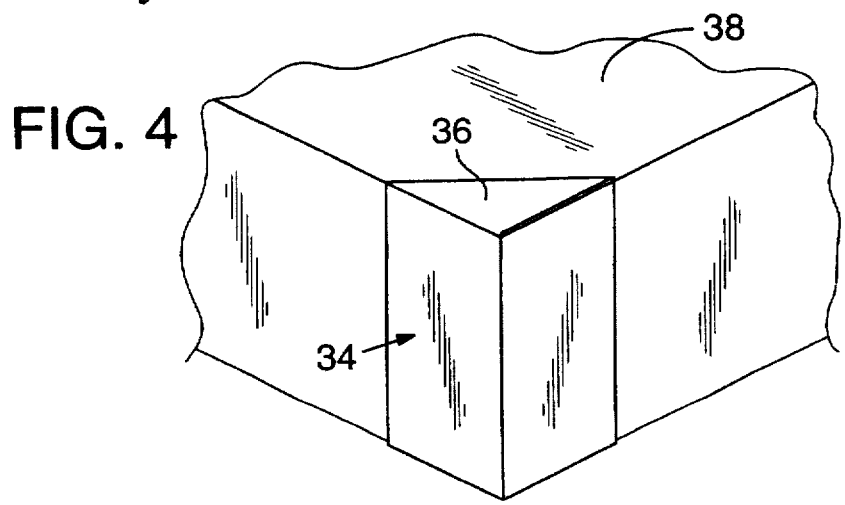

5,789,049

PREFORMED, FOLDABLE DEVICE FOR REINFORCING OR REPAIRING CARTON CORNERS

This is a continuation of application Ser. No. 08/541,679, filed Oct. 10, 1995, abandoned.

TECHNICAL FIELD OF THE INVENTION

This invention relates generally to the field of packaging. In particular, the invention relates to methods and devices for reinforcing, strengthening and repairing the corners of cartons, such as puzzle boxes, board game boxes, and shoe boxes.

BACKGROUND OF THE INVENTION

Cartons or boxes used for storage of board games and puzzles are typically constructed of cardboard and generally consist of two parts, namely the body of the box and the box lid. Over time, the corners of both the box body and lid tend to break down due to frequent removal and replacement of the lid, and general wear and tear. This may lead to loss of small objects stored within the box, such as game and puzzle pieces, which renders the game or puzzle unusable.

There thus is a need in the art for a device that reinforces and strengthens the corners of cardboard cartons or boxes, thereby reducing loss of small objects stored within the boxes.

SUMMARY OF THE INVENTION

An objective of the present invention is to provide a device which prolongs the usable life of boxes or cartons typically used to store puzzles and board games.

Another objective of the present invention is to provide a device which reinforces and strengthens the corners of such boxes, thus preventing breakdown of the corners and reducing loss of puzzle and game pieces.

An additional objective of the present invention is to provide a device which may be used to repair corners of such boxes.

A further objective of the present invention is to provide such a device which can be easily applied to the corners of the box by the end user.

Yet another objective of the present invention is to provide such a device which is inexpensive and simple to manufacture.

These and other objectives are achieved according to the present invention by providing a single flat piece cut from a sheet of thin plastic. The plastic piece is shaped such that, on being folded, it forms a right-angled corner piece, with one end of the corner piece having a triangular-shaped lid formed from two overlapping triangular sub-sections or flaps. Specifically, the plastic piece comprises a generally rectangular section divided into two approximately equally sized sub-sections by means of a vertical scored or perforated seam, together with a triangular section abutting a horizontal edge of the rectangular section and separated therefrom by a horizontal scored or perforated seam. The triangular sections divided into two approximately identical triangular sub-sections by means of an open slot extending from the apex of the triangular section to the horizontal scored seam. Upon folding, the two triangular sub-sections overlap to form the triangular-shaped lid of the right-angled corner piece.

An adhesive strip having a removable backing is provided on one side of the plastic piece, whereby, on removal of the backing, the assembled right-angled corner piece can be permanently adhered to a corner of a box or carton. Application of the right-angled corner piece reinforces and strengthens the corner of the box, thus preventing breakdown of the corner.

As the corner reinforcement of the present invention is both manufactured and, preferably, shipped to the point of sale, as a flat piece, production and shipping costs are minimized. The purchaser can readily and quickly fold the plastic piece to form the right-angled corner piece and apply the corner piece to the corners of a box or carton.

The above-mentioned and additional features of the present invention and the manner of obtaining them will become apparent, and the invention will be best understood by reference to the following more detailed description, read in conjunction with the accompanying drawings.

BRIEF DESCRIPTION OF THE FIGURES

FIG. 1 shows a plastic piece of the present invention prior to being folded to form a right-angled corner piece.

FIG. 2 is a rear view of a right-angled corner piece of the present invention, showing the overlap of the two triangular sections of the plastic sheet of FIG. 1 to form a triangular lid.

FIG. 3 is an isometric view of an assembled right-angled corner piece of the present invention.

FIG. 4 shows a right-angled corner piece of the present invention installed on the outside corner of a box lid.

DETAILED DESCRIPTION OF PREFERRED EMBODIMENTS

A flat plastic piece 10 of the present invention prior to folding to form a right-angled corner piece is shown in FIG. 1. Plastic piece 10 is cut from a single sheet of thin, rigid plastic, such as polyester or polycarbonate, preferably having a thickness between about 0.005 mm and about 0.015 mm. In a preferred embodiment, plastic piece 10 is formed of MYLAR™ having a thickness of about 0.007 mm.

Plastic piece 10 comprises a generally rectangular section 12 with a right-angled triangular section 14 adjoined to an upper edge of rectangular section 12 and separated therefrom by means of a horizontal scored or perforated seam 16. Triangular section 14 is divided into two approximately equally sized triangular sub-sections 18 and 20 by means of a vertical slot 22 extending from the apex of triangular section 14 down to horizontal scored seam 16. A small hole 24 may be provided at the junction of slot 22 and horizontal scored seam 16 to facilitate folding of plastic piece 10.

Rectangular section 12 of plastic piece 10 is divided into two approximately equally sized sub-sections 26 and 28 by means of a vertical scored or perforated seam 30 extending from horizontal scored seam 16 down to the lower edge of rectangular section 12. A pressure sensitive adhesive strip 32, having a removable backing, is mounted on rectangular section 12 and triangular section 14. In a preferred embodiment, adhesive strip 32 is about 0.002 mm thick and is a 467 or 468 high strength adhesive, and covers approximately the complete area of plastic piece 10.

In use, the backing is removed from adhesive strip 32, and plastic piece 10 is folded along scored seams 16 and 30, with triangular sections 18 and 20 overlapping, as shown in FIG. 2, to form a right-angled corner piece 34, with adhesive strip 32 located on the inner surfaces of corner piece 34. Rectangular sections 26 and 28 thus form the two perpendicular upright surfaces of corner piece 34, while overlapping triangular sections 18 and 20 are positioned perpendicular to rectangular sections 26 and 28 to form a horizontal triangular shaped lid 36 (FIG. 3).

As shown in FIG. 4, corner piece 34 may then be applied to the outer surface of a corner of box lid 38, with triangular lid 36 abutting upper surface 40 of box lid 38, and corner piece 34 being held in place by adhesive strip 32. Alternatively, corner piece 34 may be applied to the outer surface of a lower corner of a box body with triangular lid 36 abutting the lower surface of the box.

The precise dimensions of plastic piece 10 will vary with the size of the box lid or body to which the right-angled corner piece is to be applied. However, in a preferred embodiment, plastic piece 10 has a horizontal length of about 2.5 in (6.35 cm), with rectangular section 12 having a height of about 2.5 in (6.35 cm), and triangular sections 14 each having a hypotenuse of about 1.5 in (3.81 cm). In addition, rectangular section 12 may be provided with slightly scored or creased horizontal lines at regular intervals to facilitate possible cutting of plastic piece 10 by the user to better fit the depth of box body or lid.

While the present invention has been described in terms of specific embodiments, it will be apparent to one of skill in the art that the invention is susceptible to additional embodiments, and certain of the details described herein may be varied considerably without departing from the basic principles of the invention. For example, the adhesive strip may be affixed to the outer surfaces of the corner piece, whereby the corner piece may be applied to the inner surfaces of a box corner. The scope of the invention should, therefore, be determined by the following claims.

I claim:

1. A preformed, foldable device for reinforcing or repairing a corner of a box having top and side surfaces joined at the corner, the device having self-explanatory design features that guide a user during assembly of the device, comprising:

a flat piece of thin, rigid plastic material, the flat piece having a first section divided by a first fold seam extending in a first direction to form two sub-sections that define approximately equally sized geometric patterns and having a second section adjoining an edge of the first section and divided therefrom by a second fold seam extending in a second direction that is transverse to the first direction, the second section having two opposing side edges and being divided into first and second approximately equally sized flaps by a split line extending between the side edges of the second section and intersecting the second fold seam; and the flat piece having a surface coated with a preapplied adhesive material and being foldable to form a right-angled corner piece with a lid for secure placement on the top and side surfaces at the corner of the box, the two subsections of the first section having adhesive surfaces that adhere to the side surfaces of the box and the first and second flaps having respective first and second adhesive surfaces, the lid formed by mutual overlap of the first and second flaps and adhesion of the first adhesive surface to the second flap and the lid securable to the corner by adhesion of the second adhesive surface to the top surface of the box, and the right angled corner piece so formed from thin, rigid plastic material having a unitary two-layer lid that reinforces the top surface and a continuous first fold seam that secures together the side surfaces at the corner to strengthen and thereby prevent breakdown of the corner of the box immediately upon placement on the top and side surfaces at the corner of the box.

2. A device for reinforcing or repairing a corner of a box as recited in claim 1, wherein the plastic is selected from the group consisting of polyester and polycarbonate.

3. A device for reinforcing or repairing a corner of a box as recited in claim 1, wherein the plastic has a thickness of between about 0.005 mm and about 0.015 mm.

4. A device for reinforcing or repairing a corner of a box as recited in claim 1, additionally comprising a peelable backing material for covering the adhesive material coated on a surface of the flat piece.

5. A device for reinforcing or repairing a corner of a box as recited in claim 1, wherein the adhesive material comprises a pressure sensitive adhesive.

6. A device for reinforcing or repairing a corner of a box as recited in claim 1 in which the box has a depth, the device additionally comprising one or more scored lines located on the rectangular section and extending generally parallel to the second direction to facilitate cutting of the flat piece to correspond to the depth of the box corner.

7. A device for reinforcing or repairing a corner of a box as recited in claim 1, additionally comprising a hole positioned at the junction of the first fold seam and the second fold seam to facilitate folding of the flat piece.

8. A device for reinforcing or repairing a corner of a box as recited in claim 1, wherein the first direction and the second direction are substantially perpendicular to each other.

9. A device for reinforcing or repairing a corner of a box as recited in claim 1, wherein the second fold seam is a scored seam.

10. A device for reinforcing or repairing a corner of a box as recited in claim 1, wherein the geometric patterns are rectangles.

11. A device for reinforcing or repairing a corner of a box as recited in claim 1, wherein the second section is of triangular shape and the first and second flaps are of triangular shape.

* * * * *